Sept. 18, 1923.
J. G. LOWDEN
SAFETY WATER GAUGE
Filed April 27, 1922
1,468,117
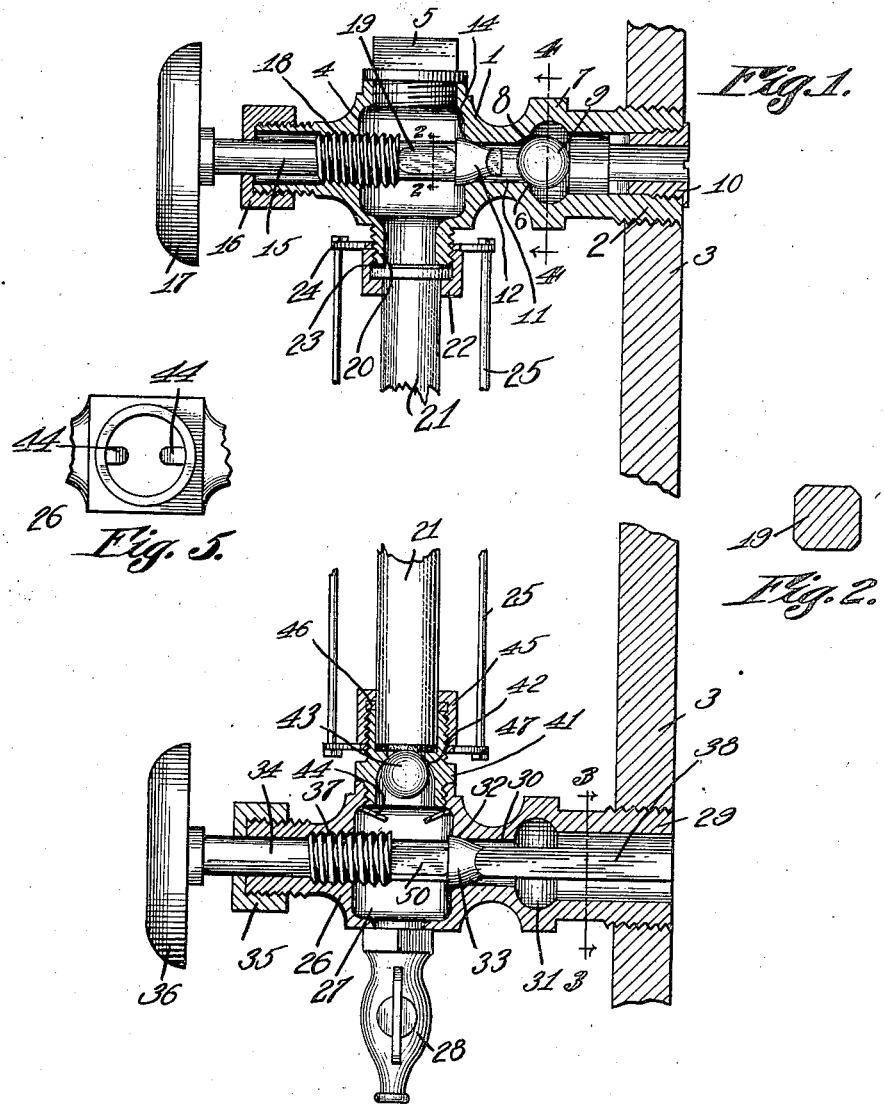
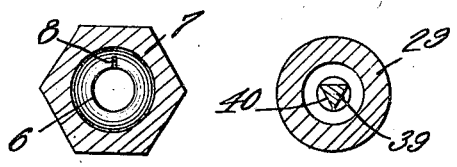

Patented Sept. 18, 1923.

1,468,117

UNITED STATES PATENT OFFICE.

JAMES GIRLY LOWDEN, OF HOUSTON, TEXAS.

SAFETY WATER GAUGE.

Application filed April 27, 1922. Serial No. 556,885.

*To all whom it may concern:*

Be it known that I, JAMES G. LOWDEN, a citizen of the United States, residing at Houston, in the county of Harris and State of Texas, have invented a new and useful Safety Water Gauge, of which the following is a specification.

This invention aims to provide means whereby, when the glass in a gauge cock breaks, the water and steam will be prevented from escaping from the boiler. Another object of the invention is to provide novel means whereby when the gauge glass breaks, an audible signal will be given, thereby advising the operator that the glass has broken.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in section, a device constructed in accordance with the invention, parts appearing in elevation; Figure 2 is a cross section through the valve stem, taken on the line 2—2 of Figure 1; Figure 3 is a cross section on the line 3—3 of Figure 1; Figure 4 is a section on the line 4—4 of Figure 1; and Figure 5 is a fragmental top plan showing a portion of the bottom member of the device.

The device forming the subject matter of this application comprises an upper member 1 having a nipple 2 which is threaded into the boiler shell 3. Intermediate its ends, the upper member 1 has an enlarged chamber 4, access being had to the chamber 4 through the instrumentality of a plug 5, threaded into the top of the member 1. A reduced bore 11 connects the chamber 4 with an enlargement 7, the enlargement communicating with the bore of the nipple 2. A seat 6 exists at the place of juncture between the bore 11 and the enlargement 7. A ball valve 9 is mounted for free movement in the nipple 2 and in the enlargement 7 and is adapted to rest on the seat 6, under steam pressure, when the gauge glass, hereinafter alluded to, is broken. There is a reduced slit or by-pass in the seat 6, and through this slit or by-pass 8 a small quantity of steam passes, when the gauge glass is broken and when the ball valve 9 is seated, as shown in Figure 1, an audible signal thus being given, admonishing the attendant that the gauge glass is broken. The ball valve 9 is held within the nipple 2 by means of a retainer or sleeve 10 which may be threaded into the inner end of the nipple 2.

There is a seat 14 at the inner end of the bore 11, and with this seat, a tapered valve 12 is adapted to cooperate, the valve being carried by a stem 15, rotatable in a cap 16 threaded on one end of the upper member 1. A hand wheel 17 is mounted on the outer end of the stem 15, the stem being threaded at 18 into the member 1, that portion of the stem which lies immediately to the rear of the valve 12 being of rectangular cross section, approximately, as denoted by the numeral 19, and as shown in Figure 2.

The upper member 1 is provided with a depending nipple 20 cooperating with a gauge tube 21, of glass, a gland nut 22 being threaded on the nipple and holding a packing 23 about the gauge tube. A spider 24 surrounds the nipple 20 and carries rods 25, forming the usual frame for the protection of the gauge tube 21.

The device includes a lower member 26 provided intermediate its ends with a chamber 27 a pet cock 28 being mounted on the bottom of the lower member 26, if desired, the pet cock communicating with the chamber 27. The lower member 26 has a nipple 29 threaded into the boiler shell 3. The bore 30 is formed in the lower member 26 and communicates with an enlargement 31, the enlargement communicating with the bore of the nipple 29. At the inner end of the bore 30, a seat 32 is fashioned in the member 26, the seat being adapted to cooperate with a valve 33 carried by a stem 34 rotatable in a cap 35 threaded on the member 26, the stem 34 carrying an external hand wheel 36 and being threaded at 37 into the member 26. The intermediate portion of the valve stem 34 may be of approximately rectangular cross section, as denoted by the numeral 50. The valve 33 has an extension 38 prolonged through the bore 30 and through the bore of the nipple 29, the extension 39 being of triangular cross section as shown at 40, so as to define longitudinal cutting edges.

A connection 41 is threaded at its lower end into the upper portion of the lower member 26 and communicates with the chamber 27, the connection being provided with a seat 42 adapted to receive a ball valve 43, having limited movement in the seat, above fingers 44 which project inwardly, from the lower member 26, into the chamber 27. A nut 45 is threaded on the connection 41 and holds a packing 46 about the gauge tube 21, the connection carrying a spider 47 receiving the lower ends of the rods 25 of the frame which protects the tube 21.

The inlets for the members 1 and 26 of the cock may be controlled in the usual way, through the instrumentality of the valves 12 and 33. Suppose, however, that the valves 12 and 33 are open, and that the cock is operating in the usual way. Suppose, further, that the gauge glass 21 should be broken. Then, under steam pressure, the valve 9 will engage the seat 6 and prevent steam in any appreciable quantity from flowing out of the boiler. A small jet of steam, however, will pass through the slit or by-pass 8, and give an audible signal, warning the attendant that the gauge glass is broken. Under the water pressure in the boiler, the ball valve 43 will rise, and, cooperating with the seat 42, prevent water from flowing out of the boiler. The device is so constructed that the valves 9 and 43 may have limited but continuous movement, the seats and the ball valves therefore being kept clear of lime or sediment.

Especial attention is directed to the fact that the extension 38 of the valve 33 is so shaped that it has longitudinal cutting edges. Therefore even though the nipple 29 be filled with lime or other sediment, the extension 38 of the valve will bore or ream a hole in the deposit, and provide a passage through which water may always find its way.

What is claimed is:

In a device of the class described, an upper member having a lateral inlet passage, a hand valve in the upper member and constituting a closure for the passage, a ball in the passage, the upper member having an internal circumferential seat for the ball, the cross sectional curvature of the seat corresponding closely to that of the ball, the seat being located immediately adjacent to that portion of the passage which the ball engages when the ball is in a closed position, the construction specified tending to keep the ball in motion and prevent the incrustation of the ball and the cementing of the ball in place; a lower member having a transverse passage, a hand valve in the lower member and controlling said passage, a connection assembled removably with the lower member and provided at its upper end with a seat, the lower member having inwardly projecting fingers, a ball in the connection and adapted to cooperate with the seat, the ball being located between the seat and the fingers, the fingers limiting the movement of the ball and preventing a hammering and a flattening of the ball on the last specified valve, and a sight tube extended between the connection and the upper member.

In testimony that I claim the foregoing as my own, I have hereto affixed my signature in the presence of two witnesses.

JAMES GIRLY LOWDEN.

Witnesses:
GEO. N. POSEY,
R. E. PREWELL.